(12) United States Patent
Aruga et al.

(10) Patent No.: US 10,514,576 B2
(45) Date of Patent: Dec. 24, 2019

(54) IMAGE DISPLAY APPARATUS

(71) Applicant: Panasonic Intellectual Property Management Co., Ltd., Osaka (JP)

(72) Inventors: Shigeru Aruga, Osaka (JP); Masashi Imai, Osaka (JP); Yoshitoshi Ooki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/097,287

(22) PCT Filed: Mar. 23, 2018

(86) PCT No.: PCT/JP2018/011600
§ 371 (c)(1),
(2) Date: Oct. 29, 2018

(87) PCT Pub. No.: WO2018/180953
PCT Pub. Date: Oct. 4, 2018

(65) Prior Publication Data
US 2019/0137828 A1 May 9, 2019

(30) Foreign Application Priority Data
Mar. 31, 2017 (JP) .................. 2017-070957

(51) Int. Cl.
*G02F 1/1335* (2006.01)
*G02F 1/1333* (2006.01)
*F21V 8/00* (2006.01)

(52) U.S. Cl.
CPC ..... *G02F 1/133608* (2013.01); *G02B 6/0068* (2013.01); *G02B 6/0088* (2013.01);
(Continued)

(58) Field of Classification Search
CPC ......... G02F 1/133608; G02F 1/133308; G02F 1/133615; G02F 2001/133322;
(Continued)

(56) References Cited

U.S. PATENT DOCUMENTS

| 6,512,557 B1 | 1/2003 | Miwa |
| 2013/0135559 A1 | 5/2013 | Deng et al. |
| 2016/0139329 A1* | 5/2016 | Sasaki ............... G02F 1/133308 362/613 |

FOREIGN PATENT DOCUMENTS

| JP | 2001-108988 A | 4/2001 |
| JP | 2009-283384 A | 12/2009 |
| WO | 2014/208385 A1 | 12/2014 |

OTHER PUBLICATIONS

International Search Report issued in Application No. PCT/JP2018/011600 dated May 15, 2018, with English translation.

\* cited by examiner

*Primary Examiner* — Charles S Chang
(74) *Attorney, Agent, or Firm* — McDermott Will & Emery LLP

(57) ABSTRACT

Image display apparatus includes liquid crystal cell, flat plate-shaped back frame, light guide plate, and a pair of support mechanisms. The pair of support mechanisms are fixed to back frame in positions at which light guide plate is clamped at both sides that intersect a first axis (X-axis). The pair of support mechanisms each includes movable component that supports light guide plate, body component that movably retains movable component, and elastic member that pushes movable component toward opposite support mechanism. Protrusion is disposed on movable component, and engagement section with which protrusion engages is disposed on light guide plate. Engagement section includes tab that is formed outwardly on an end surface of light guide (Continued)

plate, and notch disposed on tab and engages with protrusion.

6 Claims, 10 Drawing Sheets

(52) U.S. Cl.
CPC ..... *G02B 6/0091* (2013.01); *G02F 1/133308* (2013.01); *G02F 1/133615* (2013.01); *G02F 2001/133314* (2013.01); *G02F 2001/133322* (2013.01)

(58) Field of Classification Search
CPC ...... G02F 2001/133314; G02B 6/0068; G02B 6/0091; G02B 6/0088
USPC ..................................................... 349/58–65
See application file for complete search history.

IMAGE DISPLAY APPARATUS

RELATED APPLICATIONS

This application is the U.S. National Phase under 35 U.S.C. § 371 of International Application No. PCT/JP2018/011600, filed on Mar. 23, 2018, which claims the benefit of Japanese Application No. 2017-070957, filed on Mar. 31, 2017, the disclosures of which Applications are incorporated by reference herein.

TECHNICAL FIELD

The present disclosure relates to image display apparatuses that display an image.

BACKGROUND ART

Liquid crystal image display apparatuses are conventionally known as one of image display apparatuses for displaying an image (see, for example, Patent Literature (PTL) 1). In liquid crystal image display apparatuses, a backlight unit is disposed on the back surface of a liquid crystal cell. The backlight unit includes, for example, a light guide plate and a light source that emits light to an end surface of the light guide plate. For example, PTL 1 discloses a technique relating to a large and easy-to-manufacture light guide plate.

CITATION LIST

Patent Literature

PTL 1: Japanese Unexamined Patent Application Publication No. 2009-283384.

SUMMARY OF THE INVENTION

Technical Problem

The present disclosure provides a high-quality image display apparatus in which the bezel can be made slimmer.

Solution to Problem

An image display apparatus according to the present disclosure includes: a display panel that displays an image on a front surface, a frame that is flat plate-shaped and disposed behind the display panel, a light guide plate disposed between the frame and the display panel, the light guide plate emitting incident light toward the display panel, and a pair of support mechanisms fixed to the frame in positions at which the light guide plate is clamped at both sides that intersect a first axis perpendicular to a thickness of the light guide plate. The pair of support mechanisms each include: a movable component that supports the light guide plate, a body component fixed to the frame and movably retains the movable component, an elastic member that pushes the movable component toward an opposite support mechanism, and a protrusion that is disposed on the movable component and protrudes from the body component in a direction parallel with the thickness of the light guide plate. An engagement section with which the protrusion engages is disposed on both end portions of the light guide plate that intersect the first axis. The engagement section includes: a tab formed outwardly from an end surface of the light guide plate that intersects the first axis, and a notch that recedes inwardly from an end surface of an outside of the tab and engages with the protrusion.

Advantageous Effect of Invention

The present disclosure enables an image display apparatus to be made with high quality and in which a bezel can be made slimmer.

Figure 1:
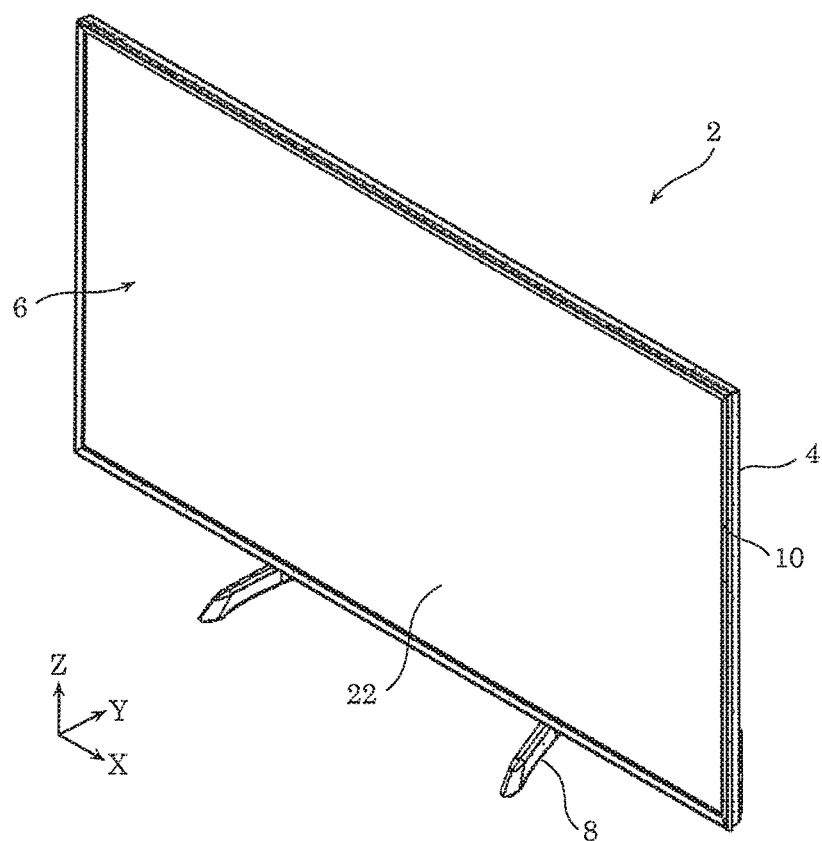
FIG. 1 is a perspective view of a front side of an image display apparatus according to an embodiment.

DESCRIPTION OF EXEMPLARY EMBODIMENT (Underlying Knowledge Forming Basis of the Present Disclosure)

The inventors have identified the following problems regarding conventional image display apparatuses. Edge-lit backlight units with light sources (for example, Light Emitting Diode (LED) bars) at upper and lower sides of a light guide plate are used as backlight units of conventional image display apparatuses such as liquid crystal television receivers. The light guide plate is made of a resin such as acrylic resin, and expands and contracts due to heat from the light sources and the like, changes in the ambient temperature, or the like.

In this manner, in the backlight unit including the light guide plate that may expand and contract, it is necessary for the light guide plate to equally expand vertically due to the light guide plate being supported around a center on the upper and lower sides for making gaps between the light guide plate and LED bars smaller in an initial state (the light guide plate is not expanded or contracted). Thus, for example, a structure is used in which a pin (securing pin) that is fixed to a flat plate-shaped frame disposed on a back surface of the light guide plate engages with a locking section (for example, a U-notch extending left/right) disposed at the center of both the left and right sides of the light guide plate.

When the longitudinal end portions of the light guide plate are supported by securing pins, places on the light guide plate most susceptible to effects of expansion are retained by the securing pins. Thus, a maximum amount of expansion and contraction of the light guide plate need to be taken into account on both the left and right sides to ensure the securing pins do not fall out of the locking sections of the light guide plate, and as a result, it becomes necessary to enlarge a width of left and right bezels.

Moreover, in order to divide the effects of expansion and contraction of the light guide plate equally between the left and right sides when the upper and lower sides of the light guide plate are supported proximate to centers thereof by the securing pins, LED elements included in a light source cannot be placed evenly due to the securing pins. As a result, luminance unevenness, for example, occurs. Moreover, luminance unevenness occurs due to effects of light reflection on the U-notches, because of the U-notches that engage with the securing pins near the LED elements.

The present disclosure is based on these observations, and as a result of deliberate study, the inventors have arrived at a structure of the image display apparatus in which a bezel can be made slimmer and which is of high quality.

Hereinafter, an embodiment will be described in detail with reference to the drawings when appropriate. However, unnecessarily detailed description may be omitted. For example, detailed descriptions of well-known matters or descriptions of components that are substantially the same as components described previous thereto may be omitted. This is to avoid unnecessary redundancy and facilitate understanding of the descriptions for those skilled in the art.

Moreover, in the descriptions of the subsequent embodiment and the scope of the claims, language such as parallel, perpendicular, or evenly spaced is used to indicate the orientation, position, and the like of one or more objects, but this includes instances where the orientation, position, and the like are not as exactly stated. For example, "parallel" includes, in addition to exactly parallel, substantially parallel, that is to say, for example, includes a margin of error of about a few percent. This also applies to language such as "identical" or "equal" which indicates the relationship between two or more pieces of information or between two or more objects.

Note that the accompanying drawings and subsequent description are provided by the inventors to facilitate sufficient understanding of the present disclosure by those skilled in the art, and are thus not intended to limit the scope of the subject matter recited in the claims.

Moreover, in the subsequent embodiment, the top-bottom direction is represented by a Z-axis, the front-back direction is represented by a Y-axis, and the left-right direction (lateral axis) is represented by an X-axis for the sake of description, but these do not limit the orientation of the image display apparatus according to the present disclosure at the time of manufacture or usage. In the subsequent descriptions, for example, an X-plus axis indicates the direction of the arrow of the X-axis and an X-minus axis indicates the direction opposite of the X-plus axis. The same applies to the Y-axis and the Z-axis.

Hereinafter, the embodiment will be described with reference to FIGS. 1 to 9. A configuration outline of the image display apparatus according to the embodiment will first be described with reference to FIGS. 1 and 2.

(1-1. Overall Configuration of Image Display Apparatus)

An overall configuration of image display apparatus 2 according to the embodiment will first be described with reference to FIGS. 1 and 2.

FIG. 1 is a perspective view of a front side of image display apparatus 2 according to the embodiment. FIG. 2 is an exploded perspective view of display unit 6 of image display apparatus 2 according to the embodiment.

As illustrated in FIG. 1, image display apparatus 2 is, for example, a flat panel display liquid crystal television receiver. Image display apparatus 2 includes casing 4, display unit 6 disposed inside of casing 4, and stand 8 supporting casing 4.

Figure 2:
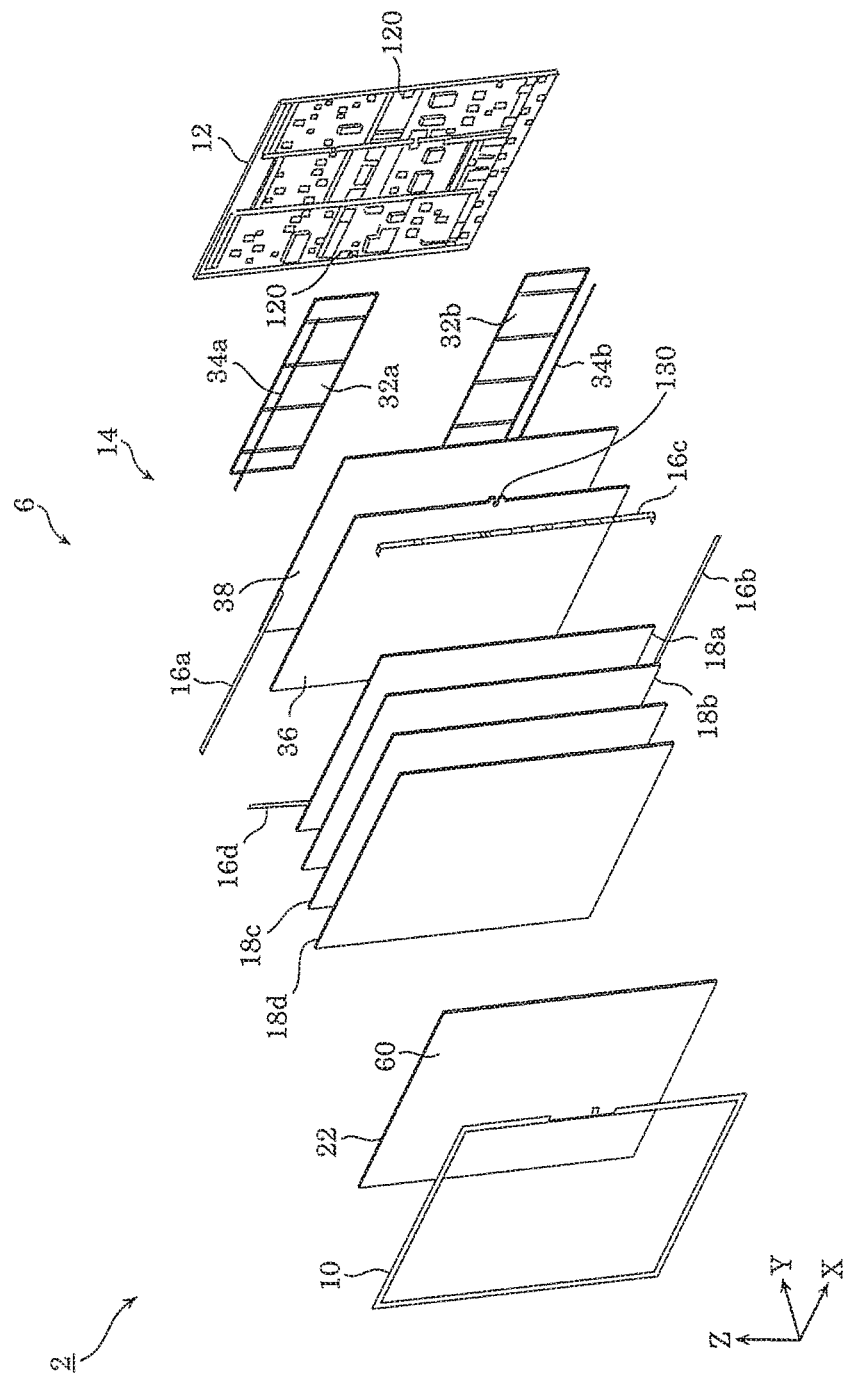
FIG. 2 is an exploded perspective view of a display unit of the image display apparatus device according to the embodiment.

As illustrated in FIG. 1, casing 4 includes bezel 10 as a front cabinet and a rear cabinet (not illustrated in FIG. 2). Bezel 10 has a rectangular shape and covers a periphery of liquid crystal cell 22 (described later) from the front side of image display apparatus 2. The rear cabinet covers back frame 12 (described later) from a back side of image display apparatus 2 and is coupled with bezel 10.

As illustrated in FIG. 2, display unit 6 includes back frame 12 (an example of the frame); backlight unit 14; molded frames 16a, 16b, 16c, and 16d (16a to 16d); optical sheets 18a, 18b, 18c, and 18d (18a to 18d); and liquid crystal cell 22 (an example of a display panel).

Back frame 12 is a metal chassis for supporting backlight unit 14 from the back side of image display apparatus 2. Back frame 12 includes, for example, protrusions for enhancing a stiffness of back frame 12 and threaded holes for fixing a variety of components onto back frame 12.

Backlight unit 14 in the present embodiment is an edge-lit backlight unit. Backlight unit 14 includes heat sink plates 32a and 32b, LED bars 34a and 34b, light guide plate 36, and reflection sheet 38.

Heat sink plates 32a and 32b are each made of a highly thermally conductive metal such as aluminum. LED bars 34a and 34b are an example of a pair of light sources and each include light-emitting elements. Each of the light-emitting elements in the present embodiment are, for example, LED elements with a packaged LED chip. Moreover, LED bars (34a and 34b) are disposed on the upper and lower sides of light guide plate 36. To be specific, LED bar 34a is disposed on the upper side (Z-plus axis) of light guide plate 36, and LED bar 34b is disposed on the lower side (Z-minus axis) of light guide plate 36.

LED bars 34a and 34b are respectively attached to heat sink plates 32a and 32b with, for example, thermally conductive double-sided tape. Heat sink plates 32a and 32b are fixed to back frame 12 with screws, and with this, LED bars 34a and 34b are also fixed to back frame 12.

Light guide plate 36 has a rectangular plate shape in a plan view. Light guide plate 36 is made of, for example, an injection-molded acrylic resin. An upper end surface of light guide plate 36 faces LED bar 34a. Light from the LED elements on LED bar 34a is received on the upper end surface of light guide plate 36. Moreover, a lower end surface of light guide plate 36 faces LED bar 34b. Light from the LED elements on LED bar 34b is received on the lower end surface of light guide plate 36.

In the present embodiment, the left and right end portions of light guide plate 36 are supported by a pair of support mechanisms 120 which are fixed to back frame 12. Engagement sections 130, which engage with support mechanisms 120, are disposed on the left and right end portions of light guide plate 36. A structure for supporting light guide plate 36 will be described later with reference to FIGS. 3 to 8.

Reflection sheet 38 covers a back surface of light guide plate 36. Reflection sheet 38 reflects light received on the upper and lower end surfaces of light guide plate 36 toward a front surface of light guide plate 36. The light reflected by reflection sheet 38 is emitted from the front surface of light guide plate 36 and received on a back surface of liquid crystal cell 22 (surface on an opposite side of display surface 60 which will be described later).

As illustrated in FIG. 2, molded frames 16a to 16d have an elongated shape. Molded frames 16a, 16b, 16c, and 16d are respectively attached to the upper end, the lower end, a right end (end of the X-plus axis), and a left end (end of the X-minus axis) of back frame 12. In other words, molded frames 16a to 16d are arranged along the periphery of light guide plate 36 in a rectangular plate shape. Molded frames 16a to 16d are disposed such that the periphery of the front surface of light guide plate 36 is retained via cushions (not illustrated in the drawings).

As illustrated in FIG. 2, optical sheets 18a, 18b, 18c, and 18d are disposed between liquid crystal cell 22 and light guide plate 36 as laid on top of one another in this order. Optical sheet 18a is a diffuser sheet for diffusing light emitted from the front surface of light guide plate 36. Optical sheets 18b and 18c are prism sheets for concentrating light, which is emitted from the front surface of light guide plate 36, on the back surface of liquid crystal cell 22. Optical sheet 18d is a reflective polarizing film (so-called Dual Brightness Enhancement Film (DBEF)) for polarizing light emitted from the front surface of light guide plate 36. The upper end and lower end (periphery) of each of optical sheets 18a to 18d are respectively supported by molded frame 16a and 16b.

Liquid crystal cell 22 has a rectangular plate shape in the plan view. The front surface of liquid crystal cell 22 is display surface 60 for displaying an image. The periphery of liquid crystal cell 22 is supported by molded frames 16a to 16d via the cushions (not illustrated in the drawings).

Bezel 10 has a rectangular plate shape and covers the periphery of display surface 60 of liquid crystal cell 22. Bezel 10 is attached to back frame 12 with, for example, screws (not illustrated in the drawings).

(1-2. Outline of Support Structure of Light Guide Plate)

Figure 3:
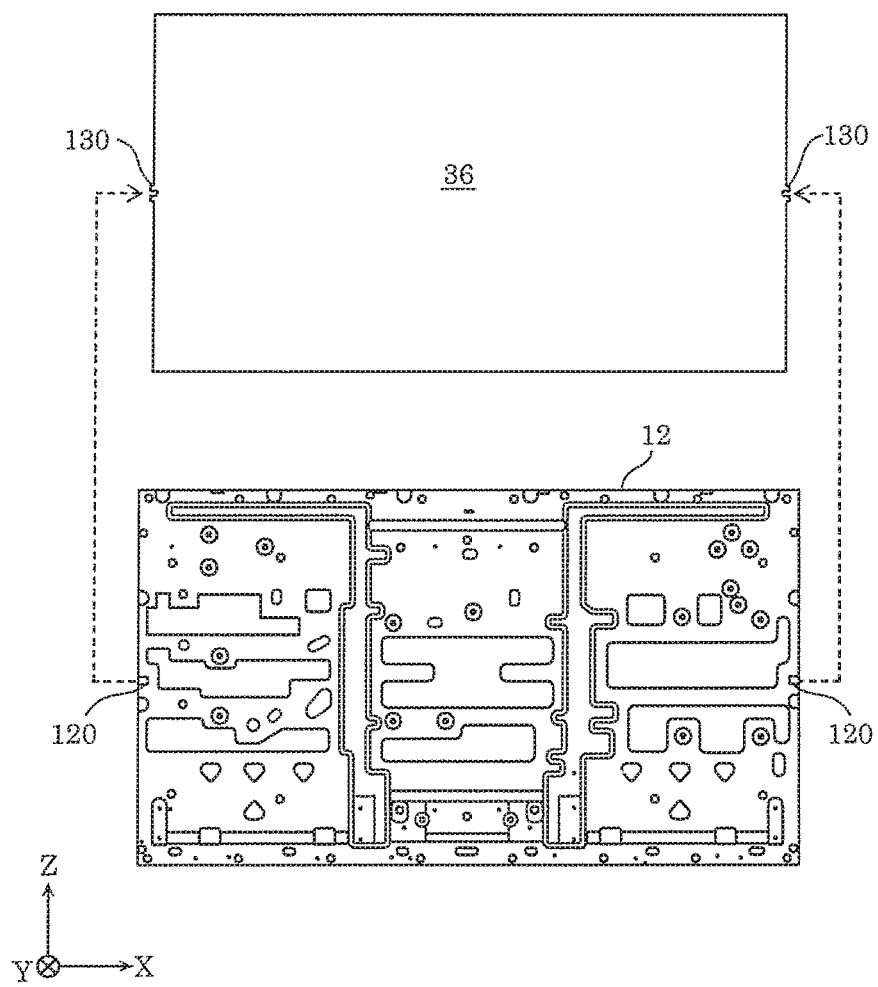
FIG. 3 is a view showing a structural relationship between a light guide plate and a back frame according to the embodiment.

Next, an outline of a structure for supporting light guide plate 36 will be described with reference to FIG. 3. FIG. 3 is a view of a structural relationship between light guide plate 36 and back frame 12 according to the embodiment.

As illustrated in FIG. 3, the pair of support mechanisms 120 is fixed to back frame 12. To be specific, support mechanisms 120 are fixed to both the upper and lower centers of the left and right end portions of back frame 12. The left and right end portions of light guide plate 36 are supported by the pair of support mechanisms 120. To be specific, engagement sections 130 that engage with support mechanisms 120 are disposed on both the upper and lower centers of the left and right end portions of light guide plate 36. In other words, light guide plate 36 is supported by the pair of support mechanisms 120 due to support mechanisms 120 engaging with both the left and right sides of the pair of engagement sections 130 of light guide plate 36.

Note that the lateral axis (X-axis) in the present embodiment is an example of a first axis perpendicular to a thickness (Y-axis) of light guide plate 36. In other words, image display apparatus 2 according to the present embodiment includes the pair of support mechanisms 120 fixed to back frame 12 in positions at which light guide plate 36 is clamped at both sides that intersect the first axis.

Moreover, support mechanisms 120 in the present embodiment each include a moveable component laterally movable, and deviations in a lateral position of light guide plate 36 are prevented when light guide plate 36 expands or contracts due to the movable component supporting thereof.

Hereinafter, the details, advantageous effects, and the like of support mechanisms 120 will be described with reference to FIGS. 4 to 9. Note that in the present embodiment, since the pair of support mechanisms 120 are structurally symmetrical to each other in respect to the Z-axis, mainly the structure and the like of the left side (X-minus axis) support mechanism 120 will be described.

(1-3. Support Mechanism)

Figure 4:
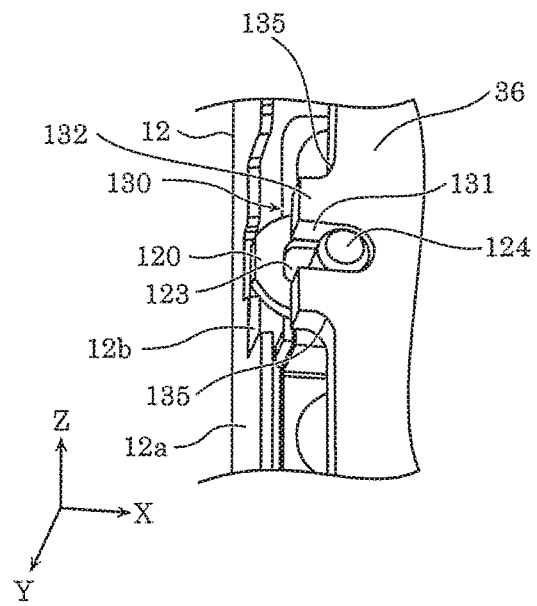
FIG. 4 is a perspective view showing a state in which a support mechanism and an engagement section are engaged according to the embodiment.
Figure 5:
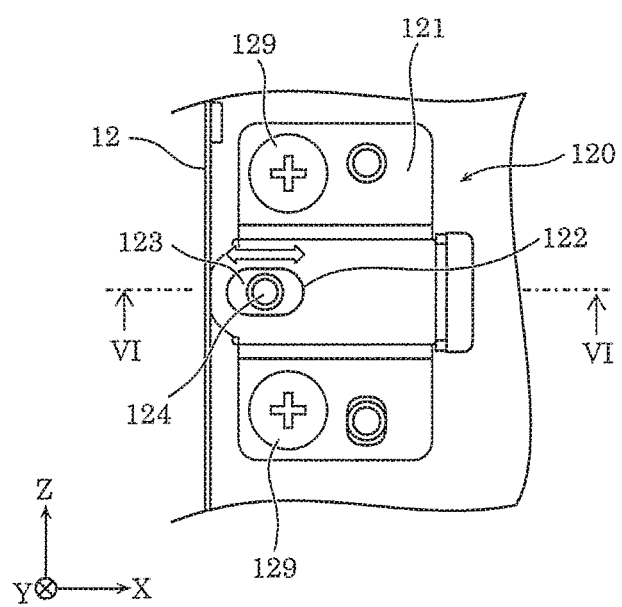
FIG. 5 is a front elevation of the support mechanism according to the embodiment.
Figure 6:
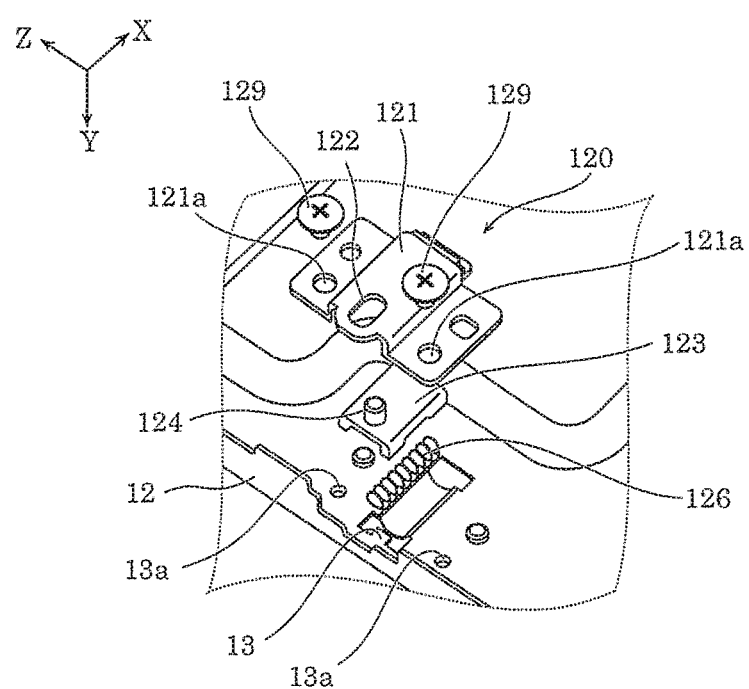
FIG. 6 is an exploded perspective view of the support mechanism according to the embodiment.
Figure 7:
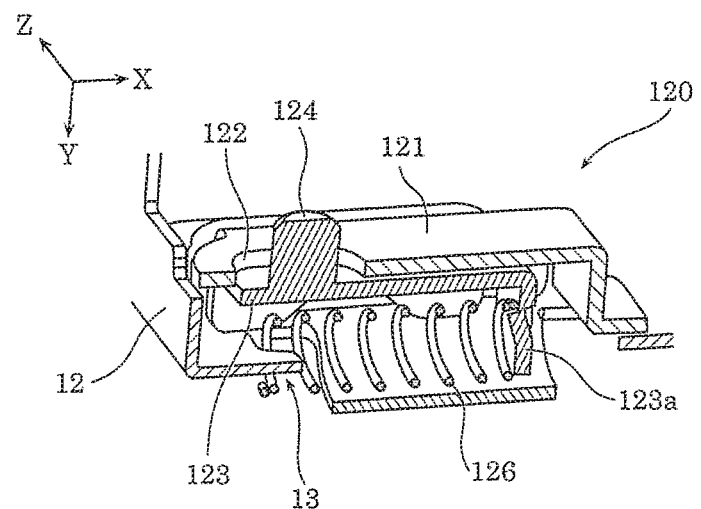
FIG. 7 is a cross-sectional perspective view of the support mechanism according to the embodiment.

FIG. 4 is a perspective view showing a state in which support mechanism 120 and engagement section 130 are engaged according to the embodiment. FIG. 5 is a front elevation of support mechanism 120 according to the embodiment. FIG. 6 is an exploded perspective view of support mechanism 120 according to the embodiment. FIG. 7 is a cross-sectional perspective view of support mechanism 120 according to the embodiment. To be specific, FIG. 7 is a perspective view of a cross-section of support mechanism 120 in an XY-plane through which line VI-VI passes in FIG. 5.

As illustrated in FIGS. 4 to 7, support mechanism 120 includes movable component 123 supporting light guide plate 36, and elastic member 126 that pushes movable component 123 toward opposite support mechanism 120 (right direction in FIG. 5)

More specifically, support mechanism 120 includes body component 121 that is fixed to back frame 12, and movable component 123 is retained movably along the lateral axis by body component 121. In the present embodiment, as illustrated in FIGS. 5 and 6, body component 121 is fixed to back frame 12 with two screws 129. To be specific, body component 121 includes two through-holes 121a, and back frame 12 includes two threaded holes 13a. Body component 121 is fixed to back frame 12 by screwing screws 129 into threaded holes 13a, screws 129 extending through both through-holes 121a in body component 121.

Moreover, as illustrated in FIGS. 4 and 7, movable component 123 includes protrusion 124 that protrudes from body component 121 in a direction parallel with the thickness (Y-axis) of light guide plate 36, and engagement section 130 that engages with protrusion 124 is disposed on the end portion along the X-axis of light guide plate 36. Body component 121 includes aperture 122 through which protrusion 124 extends and that is big enough to allow protrusion 124 to move laterally. In the present embodiment, aperture 122 includes an oval aperture that is laterally longer.

In the present embodiment, engagement section 130 disposed on light guide plate 36 includes, as illustrated in FIG. 4, tab 132 formed outwardly from the end surface (left end surface in FIG. 4) along the lateral axis of light guide plate 36, and notch 131 that engages with protrusion 124 and recedes inwardly from the end surface of the outside of tab 132. In other words, protrusion 124 included in support mechanism 120 engages with notch 131 in engagement section 130 of light guide plate 36. Note that in the present embodiment, a root of notch 131 in opposite support mechanism 120 (right side in FIG. 4) is located laterally inward of the end surface of light guide plate 36.

In support mechanism 120 having the above configuration, elastic member 126 pushes movable component 123 inward (X-plus axis). To be specific, as illustrated in FIGS. 6 and 7, locking section 13 that locks the left end portion of elastic member 126, which is a compression spring, is disposed in back frame 12; and partition 123a that is in contact with the right end portion of elastic member 126 is disposed in movable component 123 In other words, elastic member 126 is disposed between locking section 13 of back frame 12 and partition 123a of movable component 123 in a state that elastic member 126 is compressed more than a natural length thereof. Note that a position of movable component 123 (protrusion 124) in FIG. 7 is the position when protrusion 124 is engaged with engagement section 130 of light guide plate 36 (not illustrated in FIG. 7). In other words, in an initial state (light guide plate 36 is not expanded or contracted) when support mechanism 120 supports light guide plate 36, protrusion 124 is pushed inwardly and is movable to the left and right (parallel in both directions along the X-axis).

Moreover, in the present embodiment, as illustrated in FIG. 4, protrusion 124 is a pin with a circular contour as viewed along an axis (Y-axis) of the pin, and the root (closed end) of notch 131 is semicircular. With this, stress concentration at the root of notch 131 is relieved. Moreover, a base of tab 132 of light guide plate 36 includes fillet 135, and with this, stress concentration at the base of tab 132 is relieved, and luminance unevenness becomes less noticeable.

Furthermore, in the present embodiment, as illustrated in FIG. 4, lateral wall 12a that extends from the end portion of a parallel main body in the XZ-plane is disposed on back frame 12, and with this, for example, back frame 12 supporting components such as light guide plate 36 is strengthened. Moreover, lateral wall 12a includes cutout 12b in a position at which lateral wall 12a faces support mechanism 120. With this, for example, since a possible placement range of support mechanism 120 enlarges outward, a movement range of movable component 123 (protrusion 124) can be extended more outward while maintaining a size of back frame 12. In other words, engagement section 130 on light guide plate 36 can be placed more outward, and with this, the main body of light guide plate 36 (rectangular part that is a main area facing liquid crystal cell 22) can be enlarged. Therefore, liquid crystal cell 22 can have a larger active area (area of the image display apparatus with pixels) while maintaining the size of back frame 12. This is advantageous for making the bezel of image display apparatus 2 slimmer.

(1-4. Operation of Support Mechanisms)

Figure 8:
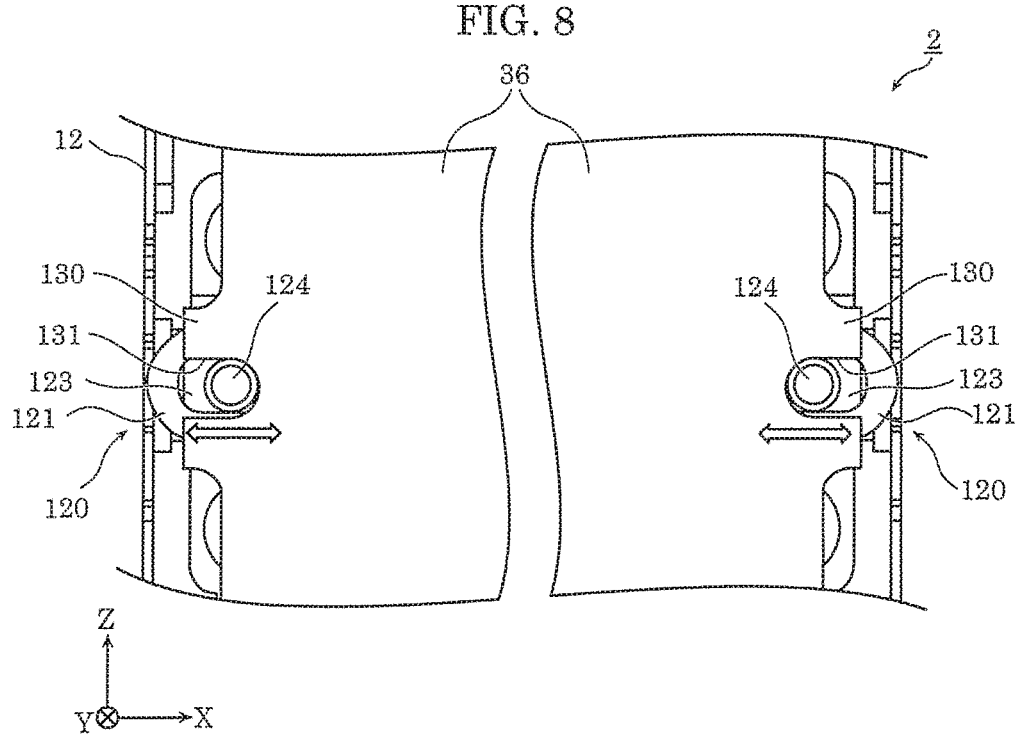
FIG. 8 is a view illustrating operation of a pair of support mechanisms according to the embodiment.

FIG. 8 is a view for illustrating operation of the pair of support mechanisms 120 according to the embodiment. As illustrated in FIG. 8, light guide plate 36 of image display apparatus 2 according to the present embodiment is supported by support mechanisms 120 disposed on the left and right sides thereof.

In support mechanisms 120, as described above, protrusions 124 directly supporting support mechanisms 120 are continuously in a state of being pressed inwardly. In other words, protrusions 124 follow the left- and rightward movement of engagement sections 130 on light guide plate 36.

Here, supposing that protrusions 124 are not movable, considering the expansion and contraction of light guide plate 36 according to changes in temperature, a lateral length of notches 131 becomes comparatively longer so that protrusions 124 do not fall out of notches 131 of engagement sections 130 and light guide plate 36 is allowed to expand.

For example, assuming that a maximum lateral expansion length and a maximum lateral contraction length of light guide plate 36 caused by changes in temperature are respectively L and M, the lateral length of left and right notches 131 needs to be longer than or equal to L+M. This is because of the possibility that only one of left and right end portions of light guide plate 36 is affected by the lateral expansion and contraction of light guide plate 36 since there are no securing pins and the like for stopping a lateral movement thereof as a whole.

However, in the pair of support mechanisms 120 according to the present embodiment, as described above, protrusions 124 follow the left- and rightward movement of engagement sections 130 on light guide plate 36 due to being pressed inward. Thus, the lateral length of notches 131 can be reduced more than when protrusions 124 are not movable (for example, when protrusions 124 are fixed to back frame 12). In other words, even when notches 131 are made shorter, protrusions 124 are prevented from falling out of notches 131 (disengagement of protrusions 124 with engagement sections 130) since protrusions 124 are pressed in a direction as to not fall out of notches 131. This enables the bezel of image display apparatus 2 to be made slimmer.

Moreover, for example, in the case of conventional image display apparatuses in which the light guide plate is attached to the back frame with the securing pins, damage such as cracks easily occurs in a part that engages with the securing pin due to, for example, comparatively heavy shocks caused by objects colliding. In regard to this, in image display apparatus 2 according to the present embodiment, protrusions 124 supporting light guide plate 36 are movable and are pushed by elastic members 126 as to not fall out of notches 131. Thus, elastic members 126 are not damaged easily (for example, cracks in engagement sections 130 on light guide plate 36) since elastic members 126 serve as shock absorbers.

Moreover, the expansion and contraction of light guide plate 36 are absorbed equally in the pair of support mechanisms 120 by making spring constants of elastic members 126 of the pair of support mechanisms 120 identical. Thus, for example, it is possible to maintain a state in which lateral center positions of liquid crystal cell 22 and light guide plate 36 are aligned.

Moreover, when light guide plate 36 is not retained by being pushed from the left and right sides, a maximum outward movement degree of the left and right end portions of light guide plate 36 from the initial state position is theoretically L since there is a possibility that maximum expansion length L affects only one of the left and right sides. Therefore, a comparatively large space on the left and right sides of light guide plate 36 becomes necessary and this hinders making the bezel slimmer.

However, in image display apparatus 2 according to the present embodiment, left and right support mechanisms 120 can accommodate half of maximum lateral expansion length L of light guide plate 36. Thus, the maximum outward movement degree of the left and right protrusions 124 and the left and right end portions of light guide plate 36 from the initial state position is theoretically (L/2). Therefore, in a front view of image display apparatus 2, the space on the left and right sides of light guide plate 36 can be made comparatively smaller, and this is advantageous for making the bezel of image display apparatus 2 slimmer.

Note that an outward protrusion degree of tabs 132 on engagement sections 130 from the end surfaces of light guide plate 36 is set at a length such that there is no friction between distal ends of tabs 132 and back frame 12 when, for example, light guide plate 36 laterally expands due to heat. Moreover, the lateral length of notches 131 in engagement sections 130 is set at a length such that the roots of notches 131 and the active area (area of the image display apparatus with pixels) of liquid crystal cell 22 do not overlap in the front view, when, for example, light guide plate 36 laterally contracts due to cooling down. In other words, for example, longer notches 131 are more advantageous to preventing protrusions 124 from falling out thereof along the lateral axis, but the length of notches 131 is set as stated above such that notches 131 do not affect an image displayed by liquid crystal cell 22.

Note that even when light guide plate 36 is not retained by being pushed from the left and right sides, it is possible to reduce the maximum movement degree of the left and right end portions of light guide plate 36 due to the securing pins that stop the lateral movement of light guide plate 36 being disposed on, for example, central parts along the lateral axis on the upper and lower end portions of light guide plate 36. However, in this case, an arrangement of the light-emitting elements that emit light to light guide plate 36 becomes uneven due to the presence of the securing pins.

In regard to this, in image display apparatus 2 according to the present embodiment, since light guide plate 36 is retained while being pushed from the left and right sides as described above, the securing pins need not be disposed on the upper and lower end portions thereof. With this, the light-emitting elements (LED elements in the present embodiment) that emit light to light guide plate 36 can be spaced evenly along the upper and lower end surfaces thereof. This will be described with reference to FIG. 9.

(1-5. LED Bars)

Figure 9:
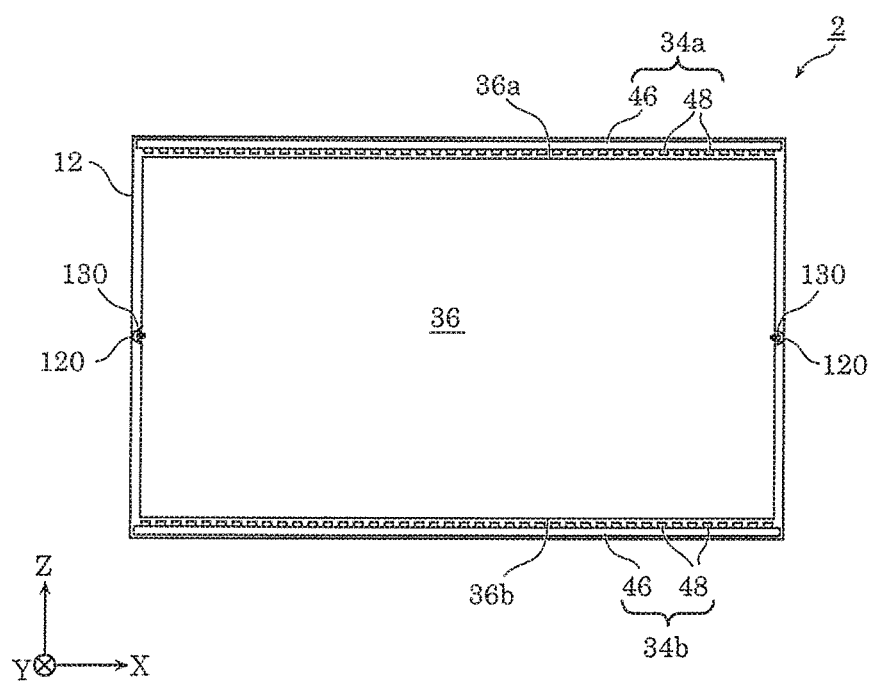
FIG. 9 is a front elevation showing a structural relationship between a pair of LED bars and the light guide plate according to the embodiment.

FIG. 9 is a front elevation showing the structural relationship between LED bars 34a and 34b, and light guide plate 36 according to the embodiment. Note that components illustrated in FIG. 9 are simplified to clarify the structural relationship between LEDs bar 34a and 35b, and light guide plate 36. For example, the number of LED elements 48 in LED bar 34a is not limited to the amount shown in FIG. 9. Moreover, other components such as heat sink plates 32a and 32b are omitted.

As illustrated in FIG. 9, in image display apparatus 2 according to the present embodiment, the pair of support mechanisms 120 that push light guide plate 36 inward from the left and right sides are disposed as supports that engage with light guide plate 36, and there are no supports on the upper and lower end portions thereof.

Thus, LED elements 48 can be placed evenly along upper end surface 36a of light guide plate 36. To be specific, LED bar 34a is disposed at a position facing upper end surface 36a of light guide plate 36, and includes elongated base plate 46 and LED elements 48 that are evenly placed lengthwise thereon. Moreover, LED elements 48 can be placed evenly along lower end surface 36b of light guide plate 36. To be specific, LED bar 34b is disposed at a position facing lower end surface 36b of light guide plate 36, and includes elongated base plate 46 and LED elements 48 that are evenly placed lengthwise thereon. Note that base plate 46 of each of LED bars 34a and 34b may also be made up of multiple base plates arranged next to each other. In other words, LED bars 34a and 34b may also consist of two or more separate LED bars that are connected to each other.

In this manner, in edge-lit backlight unit 14 that emits light to the end surfaces of light guide plate 36, luminance unevenness in liquid crystal cell 22 that is located in front of light guide plate 36 is prevented by evenly placing LED elements 48 along corresponding end surfaces thereof.

Moreover, with a structure in which supports such as securing pins are disposed on the upper or lower end portion of the light guide plate; notches, holes, or the like for engaging with the supports are disposed therein; and light from the LED elements located proximate to the notches, holes, or the like is reflected (diffused). As a result, luminance unevenness occurs in the liquid crystal cell that is located in front of the light guide plate. In regard to this, in light guide plate 36 according to the present embodiment, the upper and lower end portions include no configuration that makes the structure of light guide plate 36 uneven, such as notches, holes, or the like. Thus, there is no luminance unevenness caused by the presence of the LED elements proximate to notches, holes, or the like.

(1-6. Advantageous Effects, Etc.)

As described above, image display apparatus 2 according to the present embodiment includes liquid crystal cell 22 that displays an image on the front surface; flat plate-shaped back frame 12 disposed behind liquid crystal cell 22; light guide plate 36 disposed between back frame 12 and liquid crystal cell 22, light guide plate 36 that emits incident light toward liquid crystal cell 22; and the pair of support mechanisms 120. The pair of support mechanisms 120 are fixed to back frame 12 in positions at which light guide plate 36 is clamped at both sides that intersect the first axis (X-axis) perpendicular to the thickness of light guide plate 36. Moreover, the pair of support mechanisms 120 each include movable component 123 that supports light guide plate 36, body component 121 fixed to back frame 12 and movably retains movable component 123, elastic member 126 that pushes movable component 123 toward opposite support mechanism 120, and protrusion 124 that is disposed on movable component 123 and protrudes from body component 121 in a direction parallel with the thickness of light guide plate 36. Moreover, engagement section 130 with which protrusion 124 engages, is disposed on both end portions of light guide plate 36 that intersects the X-axis. Engagement section 130 includes tab 132 formed outwardly from the end surface of light guide plate 36 that intersects the X-axis, and notch 131 that recedes inwardly from the end surface of the outside of tab 132 and engages with protrusion 124.

In this configuration, as described above, when light guide plate 36, for example, expands or contracts due to changes in temperature, the maximum outward movement degree of the left and right end portions thereof from the initial state position can be reduced more than what was conventionally possible since light guide plate 36 can be retained by being pushed from both sides that intersect with the first axis (left and right sides in the present embodiment). Moreover, since light guide plate 36 is retained such that its lateral expansion and contraction are absorbed by the pair of support mechanisms 120, it is possible, for example, to maintain light guide plate 36 in its normalized center position. In other words, in image display apparatus 2, a structure advantageous for making the bezel slimmer is used.

Moreover, for example, since securing pins or the like for equalizing the expansion and contraction degree of the left and right end portions of light guide plate 36 need not be disposed on the longitudinal center of the upper or lower end portion thereof, notches, holes, or the like with which the securing pins or the like engage are not provided on light guide plate 36. Thus, for example, luminance unevenness due to notches, holes, or the like reflecting the light emitted from the upper or lower end portions of light guide plate 36 does not occur in liquid crystal cell 22.

Moreover, a simple configuration of support mechanism 120 can be realized in which movable component 123 slides with respect to body component 121, which is fixed to back frame 12. Since support mechanism 120 can support light guide plate 36 due to protrusion 124 engaging with engagement section 130, the pair of support mechanisms 120 can be disposed in respect to light guide plate 36 without the need for complicated labor.

Protrusion 124 can easily be engaged with engagement section 130 by inserting protrusion 124 in notch 131 from the outside along the X-axis. Movable component 123 including protrusion 124 is pushed inwardly by elastic member 126. In other words, protrusion 124, which is inserted in notch 131 from the outside along the X-axis, is pushed along the insertion direction by elastic member 126. Thus, for example, protrusion 124 follows the movement of notch 131 when light guide plate 36 expands, contracts, or moves. Therefore, even when the length of notch 131 along the X-axis is comparatively short, protrusion 124 does not easily fall thereout. For example, notch 131 may also have a shorter length along the X-axis (longitudinal length in the present embodiment) than, for example, protrusion 124 along the X-axis. Therefore, an increase in overall length of light guide plate 36 along the X-axis can be prevented by disposing engagement section 130 on both end portions thereon along the X-axis. This is, for example, advantageous for making the bezel of image display apparatus 2 slimmer.

Moreover, supposing that the parts which allow the pair of support mechanisms to support the light guide plate, are disposed as cutouts in the left and right end surfaces of the light guide plate, luminance unevenness would easily occur in liquid crystal cell 22 therefrom. In regard to this, in the present embodiment, notch 131 with which protrusion 124 of movable component 123 engages, is for the most part disposed in tab 132 which is formed outwardly from the end surface of light guide plate 36. Thus, luminance unevenness in the area proximate to notch 131, liquid crystal cell 22, and light guide plate 36 is less noticeable.

In this manner, image display apparatus 2 according to the present embodiment is a high-quality image display apparatus in which the bezel can be made slimmer.

Moreover, in image display apparatus 2 according to the present embodiment, the root of notch 131, with which one of the pair of support mechanisms 120 engages, nearest opposite support mechanism 120 is located inward of the end surface of light guide plate 36 along the first axis.

In other words, notch 131 in light guide plate 36 is disposed such that the end surface on which tab 132 is disposed and the root of notch 131 (distal inner surface along the extension of notch 131) disposed on tab 132 do not align. With this, for example, randomness of light in the reflection direction at the root of notch 131 and the area proximate thereto is improved. As a result, in the displayed image of liquid crystal cell 22, luminance unevenness in positions corresponding to the root of notch 131 and the area proximate thereto becomes less noticeable.

Moreover, in image display apparatus 2 according to the present embodiment, protrusion 124 is a pin with a circular contour as viewed along the axis thereof and the root of notch 131 nearest opposite support mechanism 120 has a curved shape that follows the circular contour of protrusion 124.

In this configuration, the possibility of the circumferential surface of protrusion 124 and the root of notch 131 to be in point contact with each other is reduced, and as a result, stress concentration at the root of notch 131 is relieved due to protrusion 124 being pushed inwardly. As a result, for example, the quality of light guide plate 36, whose lateral expansion and contraction are absorbed by the pair of support mechanisms 120, can be maintained. Moreover, as described later on in the variation, even when the orientation of support mechanism 120 is slanted in the XZ-plane, the circumferential surface of protrusion 124 and the root of notch 131 can easily be maintained in surface contact with each other. Thus, for example, support mechanism 120 can steadily push engagement section 130 inwardly regardless of the orientation of support mechanism 120, Moreover, the same support mechanism 120 can be used with different orientations for multiple types of products.

Moreover, in image display apparatus 2 according to the present embodiment, the base of tab 132 nearest light guide plate 36 includes fillet 135. In other words, the base portion of tab 132 is gradually sloped from the end surface of light guide plate 36 that intersects with the X-axis. In other words, the base portion of tab 132 has a concave curvature as viewed along the thickness of light guide plate 36.

Thus, the stress concentration at the base portion of tab 132, which laterally protrudes from the main body of light guide plate 36, is relieved. This also enables, for example, the quality of light guide plate 36, whose lateral expansion and contraction are absorbed by the pair of support mechanisms 120, to be maintained. Moreover, since light at the base portion of tab 132 along the reflection direction is gradually converted, luminance unevenness in the displayed image of liquid crystal cell 22 in a position corresponding with the base portion of tab 132 becomes less noticeable.

Moreover, image display apparatus 2 according to the present embodiment further includes a pair of LED bars 34a and 34b that are disposed on both sides of light guide plate 36 along the thickness thereof (Y-axis) and the second axis (Z-axis) perpendicular to the first axis (X-axis). LED bars 34a and 34b both include the plurality of LED elements 48 that are placed evenly on the end surfaces (upper end surface 36a or lower end surface 36b) of light guide plate 36 that intersect the Z-axis. Moreover, each body component 121 of the pair of support mechanisms 120 movably retain movable component 123 along the first axis (X-axis).

As stated above, since securing pins or the like need not be disposed on the longitudinal central parts of the upper or lower end portion of light guide plate 36, the plurality of LED elements 48 can be spaced evenly. In other words, the distance between adjacent LED elements 48, which emit light to light guide plate 36, is equal. This enables the light emitted from light guide plate 36 to be made uniform, and as a result, luminance unevenness in liquid crystal cell 22 can be prevented Moreover, since movable component 123 retains body component 121 such that movable component 123 moves parallel with X-axis, the lateral expansion (in other words, along the X-axis) of light guide plate 36 does not cause a vertical displacement thereof even when, for example, light guide plate 36 expands due to heat. Thus, for example, when light guide plate 36 expands due to heat, friction between light guide plate 36 and upper and lower LED bars 34a and 34b does not occur easily.

(Variation)

Next, a variation of the above embodiment will be described. The present variation differs from the above embodiment in that the light source (LED bar) is disposed on only one of the upper and lower sides of the light guide plate. Moreover, the present variation also differs from the above embodiment in that the pair of support mechanisms 120 alter the vertical position of the light guide plate depending on the expansion and contraction thereof. Image display apparatus 2a according to the variation having such features will be described focusing on differences with the above embodiment with reference to FIGS. 10 to 13.

Figure 10:
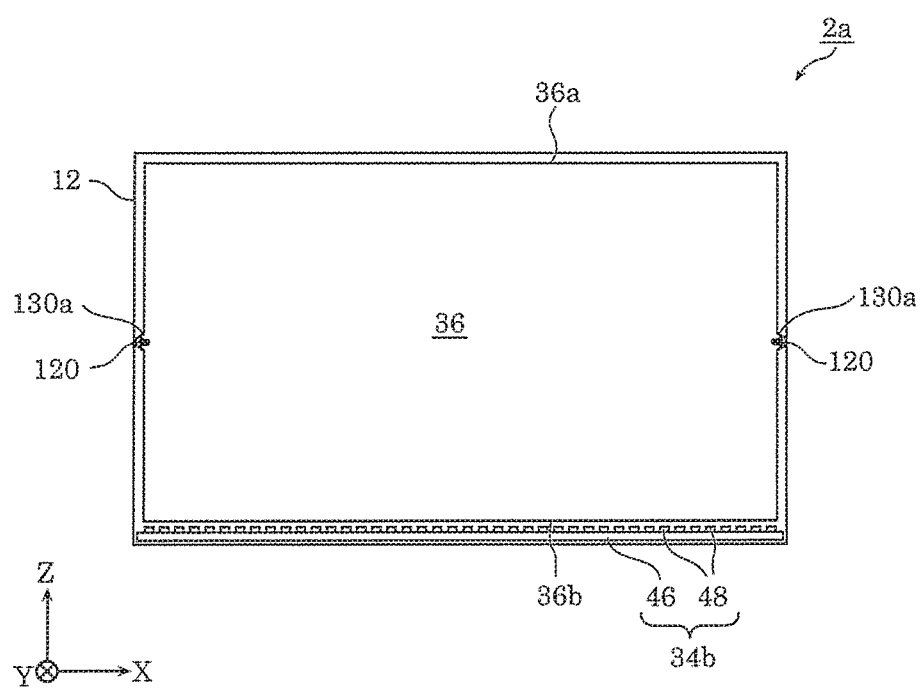
FIG. 10 is a front elevation showing a structural relationship between the LED bar and the light guide plate according to a variation of the embodiment.
Figure 11:
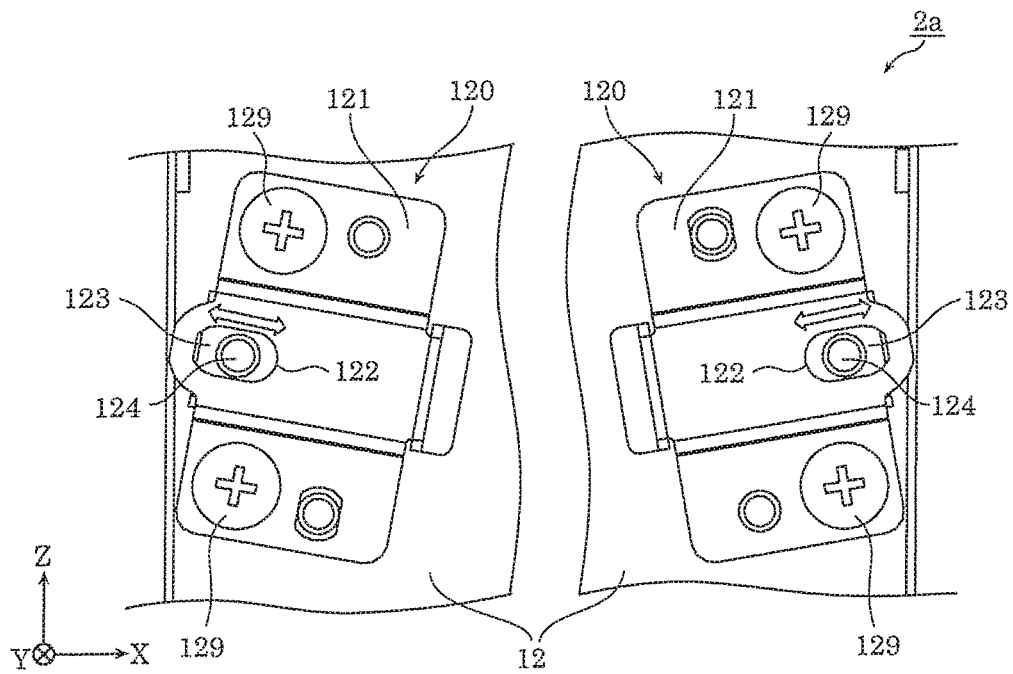
FIG. 11 is a front elevation of the pair of support mechanisms according to the variation of the embodiment.
Figure 12:
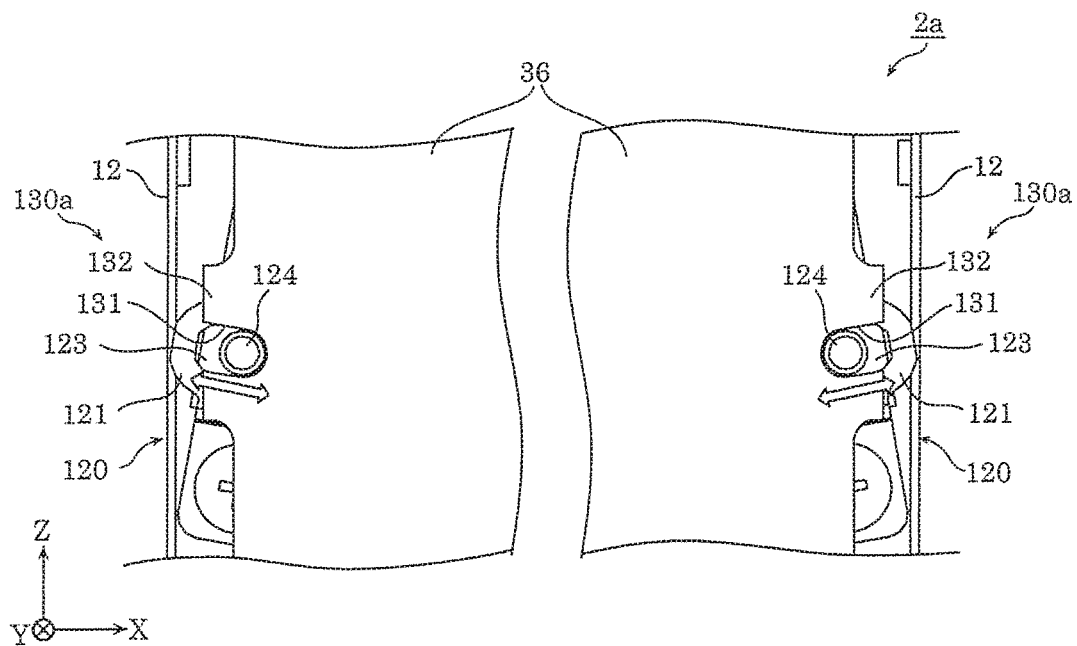
FIG. 12 is a view for illustrating operation of the pair of support mechanisms according to the variation of the embodiment.
Figure 13:
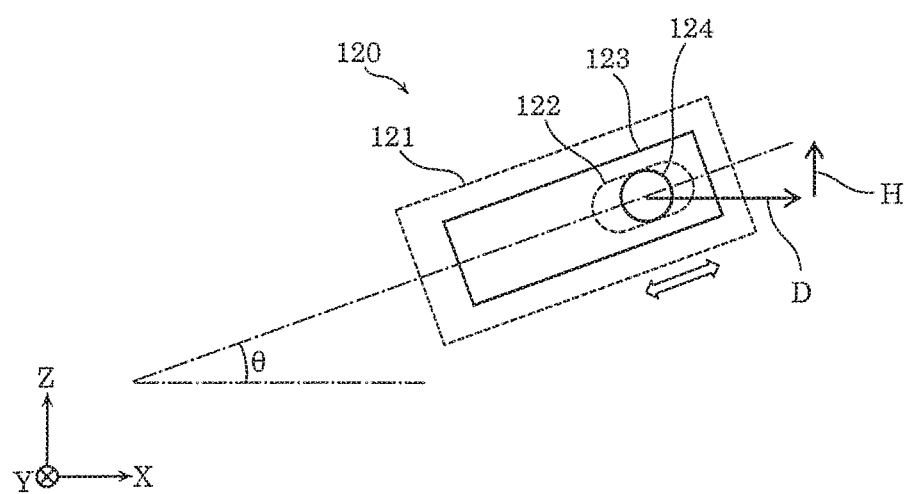
FIG. 13 is a view for illustrating a movement direction and a movement degree of a movable component according to the variation of the embodiment.

FIG. 10 is a front elevation showing the structural relationship between LED bar 34b and light guide plate 36 according to the variation of the embodiment. FIG. 11 is a front elevation of the pair of support mechanisms 120 according to the variation of the embodiment. FIG. 12 is a view for illustrating operation of the pair of support mechanisms 120 according to the variation of the embodiment. FIG. 13 is a view for illustrating the movement direction and the movement degree of movable component 123 according to the variation of the embodiment. Note that in FIG. 13, movable component 123 including protrusion 124 is represented with solid lines, and body component 121 and aperture 122 with dotted lines.

As illustrated in FIG. 10, in image display apparatus 2a according to the present variation, the pair of support mechanisms 120 are disposed in positions at which light guide plate 36 is clamped at both sides that intersect the first axis (X-axis) perpendicular to the thickness thereof similar to image display apparatus 2 according to above embodiment. Moreover, protrusions 124 disposed in movable components 123 in each of the pair of support mechanisms 120 engage with engagement sections 130a disposed on the end portions of light guide plate 36 along the X-axis.

However, in the present variation, the light source (LED bar 34b) that emits light to light guide plate 36 is disposed on only the lower side thereof, and the pair of support mechanisms 120 are fixed to back frame 12 in a slanted orientation in the XZ-plane.

To be specific, body components 121 in the pair of support mechanisms 120 movably retain movable components 123 in a direction in which movable components 123 move away from LED bar 34b with an increase in distance from opposite support mechanism 120. In other words, to describe right support mechanism 120 in FIG. 11, body component 121 movably retains movable component 123 in a direction in which movable component 123 moves away from LED bar 34b (in other words, upward) the more it goes to the right. In other words, in right support mechanism 120 in FIG. 11, body component 121 movably retains movable component 123 in a direction in which movable component 123 moves closer to LED bar 34b (in other words, downward) the more it goes to the left.

With this configuration, the distance between LED bar 34b and lower end surface 36b of light guide plate 36 remains the same when light guide plate 36, for example, expands due to heat. In other words, when light guide plate 36 expands due to heat, light guide plate 36 grows in width laterally (first axis, X-axis) and vertically (second axis, Z-axis). Thus, for example, when the central position of light guide plate 36 does not change vertically such as in image display apparatus 2 according to the above embodiment, lower end surface 36b thereof moves closer to LED bar 34b when light guide plate 36 expands due to heat.

Accordingly, in image display apparatus 2a according to the present variation, the pair of support mechanisms 120 are connected to light guide plate 36 such that light guide plate 36 moves vertically along with the expansion and contraction thereof. To be specific, for example in FIG. 12, when light guide plate 36 expands laterally, protrusions 124 (movable components 123) in the pair of support mechanisms 120 are only pushed outward with a substantially identical distance when the spring constants of elastic members 126 (see, for example, FIG. 7) in the pair of support mechanisms 120 are identical. Here, since protrusions 124 (movable components 123) move away from LED bar 34b, or upward in FIG. 12, engagement sections 130 on light guide plate 36 also move upward. As a result, even when light guide plate 36 expands laterally as well as vertically, the downward movement degree of lower end surface 36b of light guide plate 36 can be compensated, and with this, the vertical position thereof can be substantially maintained the same. This will be described quantitatively with reference to FIG. 13.

As illustrated in FIG. 13, assuming that an angle between the movement direction of protrusion 124 and the lateral axis (X-axis) is θ, the movement degree of protrusion 124 along the X-axis is D, and the vertical (Z-axis) movement degree is H, then H=D tan θ.

Moreover, assuming that the maximum lateral expansion length of light guide plate 36 is La and the spring constants of elastic members 126 in the pair of support mechanisms 120 are identical, then movement degree D of protrusion 124 along the X-axis in one of support mechanisms 120 can be considered to be La·(½). Therefore, in this case, movement degree H of protrusion 124 along the Z-axis is La·(½)tan θ.

On the other hand, assuming that an aspect ratio of the size of light guide plate 36 is 9:16 and linear expansion coefficients of light guide plate 36 are identical vertically and laterally, then vertical maximum expansion length Lb of light guide plate 36 is La·(9/16). Moreover, when engagement section 130a is disposed on the vertical center of light guide plate 36, a downward displacement degree of lower end surface 36b of light guide plate 36 relative to engagement section 130a is then Lb·(½), or in other words, La·(9/32).

When the displacement degree is compensated by movement degree H of protrusion 124 along the Z-axis, then La·(½)tan θ=La·(9/32), θ being approximately 29.3° in order to meet this criterion. In other words, according to these calculations, by attaching the pair of support mechanisms 120 to back frame 12 at an orientation in which θ is approximately 29.3°, the distance between lower end surface 36b of light guide plate 36 and LED bar 34b can be maintained approximately constant when light guide plate 36 expands due to heat. Note that an upward movement degree of lower end surface 36b of light guide plate 36 can be compensated by engagement section 130a thereof moving downward when light guide plate 36 contracts laterally and vertically. In other words, the distance between lower end surface 36b of light guide plate 36 and LED bar 34b can be maintained substantially the same.

Moreover, in what orientation to actually fix support mechanisms 120 to back frame 12 can be decided appropriately depending on physical property values such as the vertical and lateral linear expansion coefficients of light guide plate 36, test results using thereof and the like.

Moreover, in the present variation, LED bar 34b is described as being disposed on the lower side of light guide plate 36, but LED bar 34a may also be disposed on the upper side thereof (see FIG. 9). In this case, by flipping the inclination of the pair of support mechanisms 120 vertically, the distance between upper end surface 36a of light guide plate 36 and LED bar 34a can be maintained substantially the same while absorbing the expansion of light guide plate 36.

As described above, image display apparatus 2a according to the present variation includes LED bar 34b that is the light source disposed on one of two sides of light guide plate 36 that intersect the second axis (Z-axis). LED bar 34b includes LED elements 48 spaced evenly along the end surface (lower end surface 36b) of light guide plate 36 facing LED bar 34b. Body component 121 in the pair of support mechanisms 120 movably retains movable component 123 in a direction in which movable component 123 moves away from LED bar 34b with an increase in distance from opposite support mechanism 120.

In this configuration, for example, when LED bar 34b is disposed on only one of upper and lower sides of light guide plate 36, the distance between the end surface thereof facing LED bar 34b and LED bar 34b can be maintained substantially the same independent of the expansion and contraction of light guide plate 36. Therefore, for example, even when light guide plate 36 expands and contracts caused by changes in the ambient temperature as image display apparatus 2a is set up, heat generated by internal components thereof or the like, a suitable distance between the end surface of light guide plate 36 and LED bar 34b can be maintained.

Note that in the present variation, notches 131 included in engagement sections 130a are laid out diagonally to the X-axis and in the same movement direction as protrusions 124. However, notches 131 included in engagement sections 130a according to the present variation may also be laid out parallel with the X-axis similar to notches 131 according to the above embodiment. In other words, a force applied to engagement sections 130a via protrusions 124 functions as the force that pushes engagement sections 130a inward, regardless of the extension direction of notches 131. Moreover, when protrusions 124 are pins with a circular contour and the roots of notches 131 have a curved shape that follows the circular contour of protrusions 124, circumferential surfaces of protrusions 124 and the roots of notches 131 easily remain in contact with each other, regardless of the extension direction of notches 131.

(Other Embodiments)

The above embodiment has been described as an example of a technique disclosed in the present application. However, the technique in the present disclosure is not limited to the above embodiment; various changes, substitutions, additions, omissions, etc., may be made to the embodiment. Moreover, each component included in the above-described embodiment may be combined to achieve new embodiments. Next, other embodiments will be exemplified below.

For example, elastic member 126 included in support mechanism 120 is a compression spring. However, elastic member 126 may also be a tension spring. For example, a tension spring that is stretched more than the natural length thereof, and connects to movable component 123 and to body component 121 or back frame 12. With this, movable component 123 can be pushed inward (toward opposite support mechanism 120). Moreover, elastic member 126 is not limited to any particular type and a leaf spring may also be used for example. Furthermore, the material of elastic member 126 is not limited to metal, but highly durable resin may also be used for example.

Moreover, engagement section 130 includes notch 131 for engaging with protrusion 124, but may also include, for example, a hole for engaging therewith. In other words, as long as engagement section 130 is shaped as to be engageable with protrusion 124, the shape thereof is not particularly limited.

Moreover, for example, back frame 12 may also function as body component 121 in support mechanism 120. In other words, the end portion of back frame 12 may include a part (retainer) that movably retains movable component 123 in an orientation in which elastic member 126 applies the force thereon. In this case, support mechanism 120 can be configured such that movable component 123 and elastic member 126 can be attached to the retainer.

Moreover, for example, light guide plate 36 need not include sections that differ distinctly from other parts similar to engagement section 130 according to the above embodiment. For example, even when light guide plate 36 is a simple rectangular plate without engagement section 130, support mechanism 120 can support light guide plate 36 by having a structure in which movable component 123 grips the edge of light guide plate 36 along the X-axis. In other words, even in this case, the pair of support mechanisms 120 can retain light guide plate 36 by pushing it from the left and right sides.

Moreover, in the present embodiment, image display apparatus 2 is realized as, for example, a liquid crystal television receiver. However, the configuration of image display apparatus 2 may, for example, also be employed as a computer monitor for personal computers, a portable device such as a tablet or a smartphone, and the like.

The above embodiment has been presented as an example of the technique disclosed according to the present application. The accompanying drawings and the detailed description are provided for this purpose.

Therefore, the components described in the accompanying drawings and the detailed description may include, in addition to components essential to overcoming problems, components that are not essential to overcoming problems but are included in order to exemplify the technique described above. Thus, those non-essential components should not be deemed essential due to the mere fact that the non-essential components are illustrated in the accompanying drawings and described in the detailed description.

The above embodiment is an example of the technique in the present disclosure, and thus various modifications, substitutions, additions, and omissions are possible in the scope of the claims and equivalent scopes thereof.

INDUSTRIAL APPLICABILITY

The present disclosure is applicable to an image display apparatus for displaying an image. To be specific, the present disclosure is applicable to a television receiver, a monitor display, an electronic billboard, a tablet, a smartphone, or a table-embedded display apparatus, and the like.

The invention claimed is:

1. An image display apparatus, comprising:
a display panel that displays an image on a front surface;
a frame that is flat plate-shaped and disposed behind the display panel;
a light guide plate disposed between the frame and the display panel, the light guide plate emitting incident light toward the display panel; and
a pair of support mechanisms fixed to the frame in positions at which the light guide plate is clamped at both sides that intersect a first axis perpendicular to a thickness of the light guide plate, wherein
the pair of support mechanisms each include:
a movable component that supports the light guide plate;
a body component fixed to the frame and movably retains the movable component;
an elastic member that pushes the movable component toward an opposite support mechanism; and
a protrusion that is disposed on the movable component and protrudes from the body component in a direction parallel with the thickness of the light guide plate,
an engagement section with which the protrusion engages is disposed on both end portions of the light guide plate that intersect the first axis,
the engagement section includes:
a tab formed outwardly from an end surface of the light guide plate that intersects the first axis; and
a notch that recedes inwardly from an end surface of an outside of the tab and engages with the protrusion.

2. The image display apparatus according to claim 1, wherein
- a root of the notch nearest the opposite support mechanism is located inward of the end surface of the light guide plate that intersects the first axis.

3. The image display apparatus according to claim 1, wherein
- the protrusion is a pin with a circular contour as viewed along an axis of the pin, and
- the root of the notch nearest the opposite support mechanism has a curved shape that follows the circular contour of the protrusion.

4. The image display apparatus according to claim 1, wherein
- a base of the tab nearest the light guide plate includes a fillet.

5. The image display apparatus according to claim 1, further comprising:
- a pair of light sources disposed on both sides of the light guide plate that intersect a second axis perpendicular to the thickness of the light guide plate and the first axis, wherein
- the pair of light sources each include a plurality of light-emitting elements that are evenly spaced along the end surface of the light guide plate that intersects the second axis, and
- the body component movably retains the movable component along the first axis.

6. The image display apparatus according to claim 1, further comprising:
- a light source on one of both sides of the light guide plate that intersect a second axis perpendicular to the thickness of the light guide plate and the first axis, wherein
- the light source includes a plurality of light-emitting elements that are evenly spaced along the end surface of the light guide plate facing the light source, and
- each of the body components of the pair of support mechanisms movably retains the movable component in a direction in which the movable component moves away from the light source with an increase in distance from the opposite support mechanism.

* * * * *